May 20, 1958 H. G. BAILEY ET AL 2,834,986
MACHINE FOR ROTATIONAL CASTING
Filed Aug. 4, 1954 8 Sheets-Sheet 1

INVENTORS
HAROLD G. BAILEY &
PAUL REKETTYE
BY
ATTORNEYS

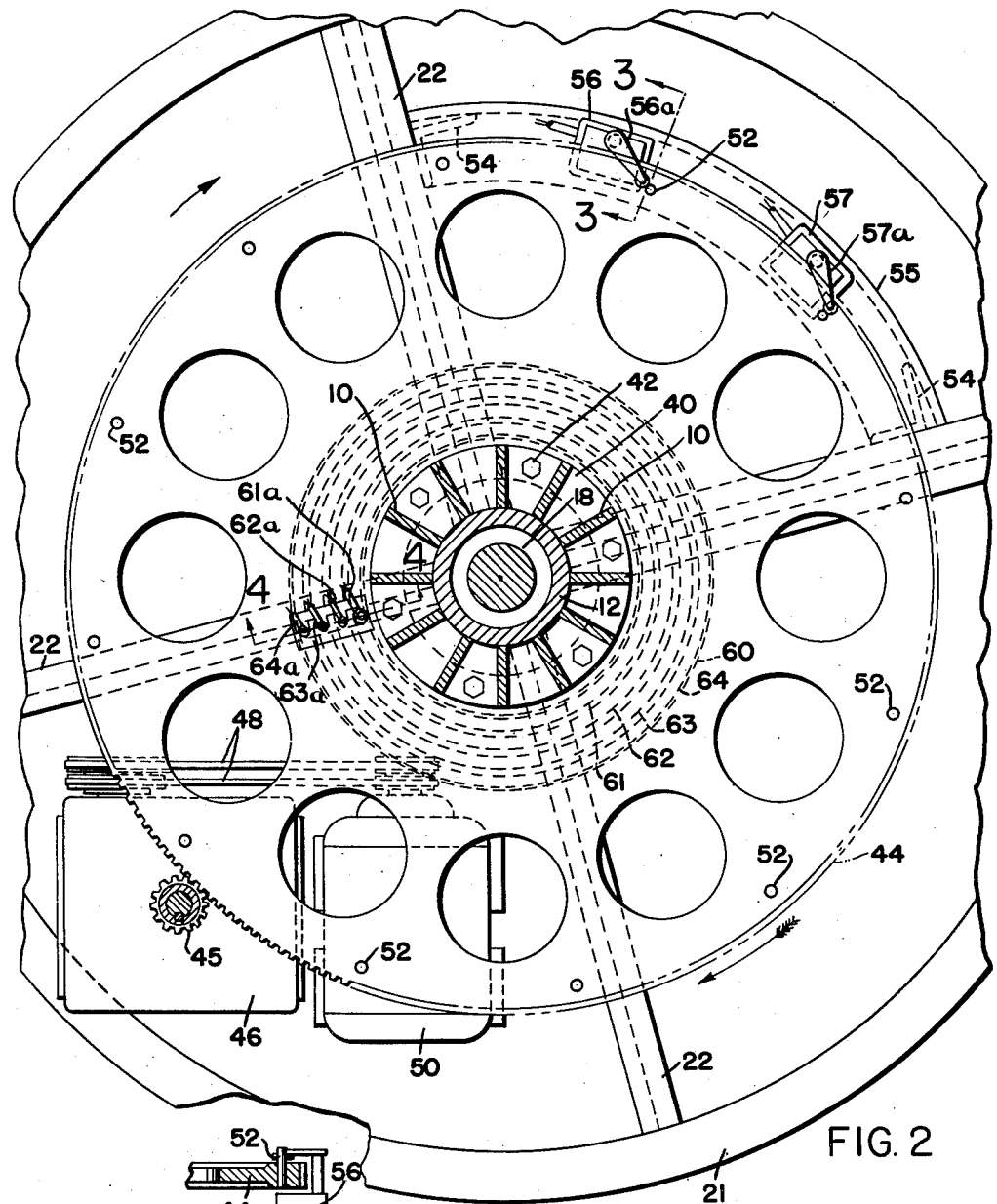
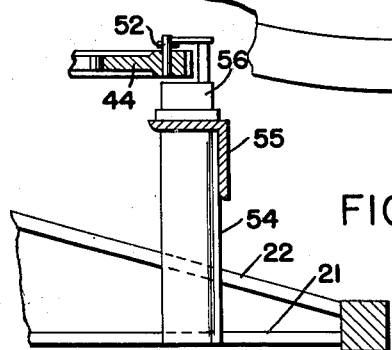
FIG. 2
FIG. 3
*INVENTORS*
HAROLD G. BAILEY &
PAUL REKETTYE
BY
ATTORNEYS

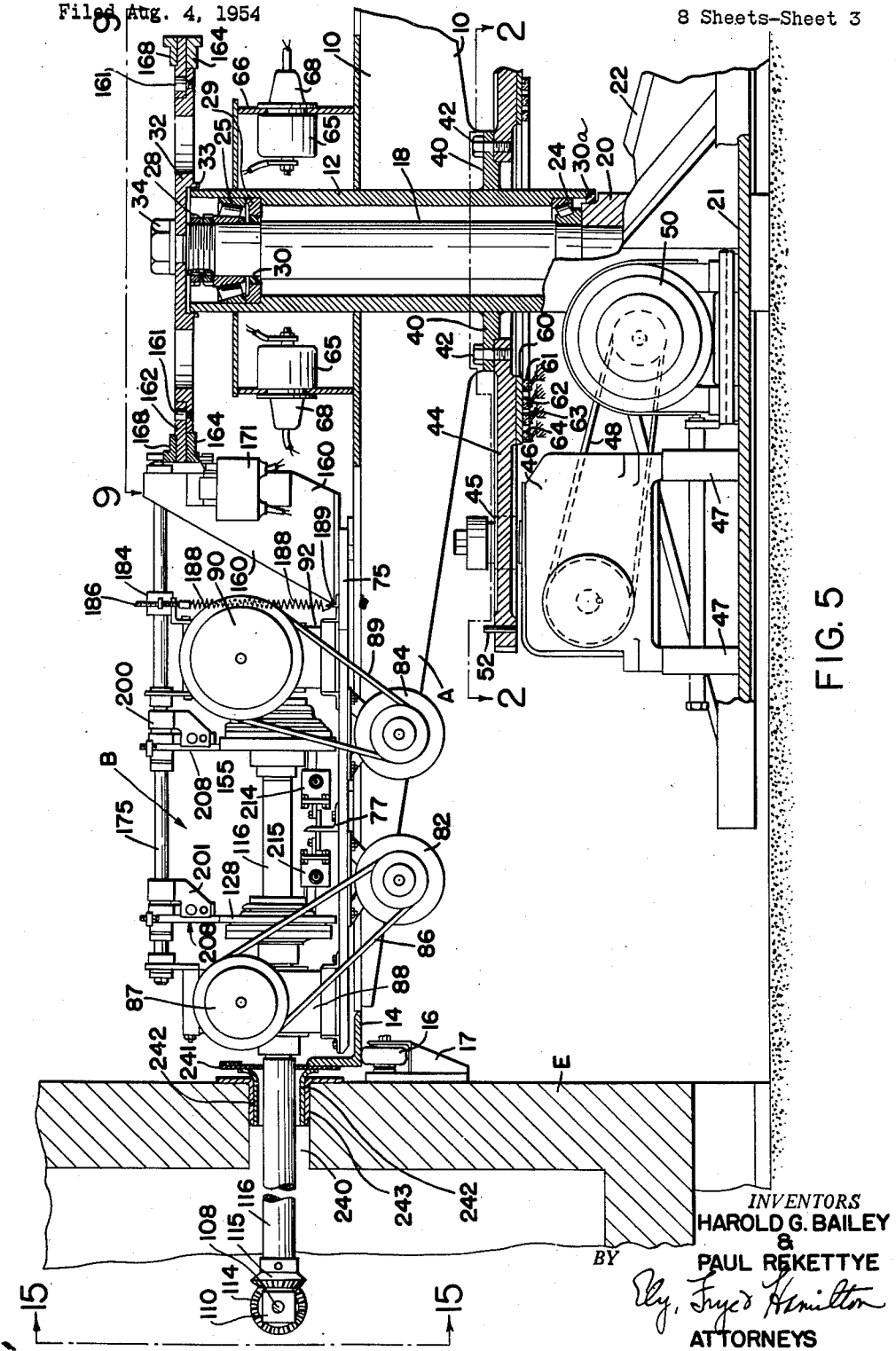

INVENTORS
HAROLD G. BAILEY &
PAUL REKETTYE
BY
ATTORNEYS

May 20, 1958 H. G. BAILEY ET AL 2,834,986
MACHINE FOR ROTATIONAL CASTING
Filed Aug. 4, 1954 8 Sheets-Sheet 5
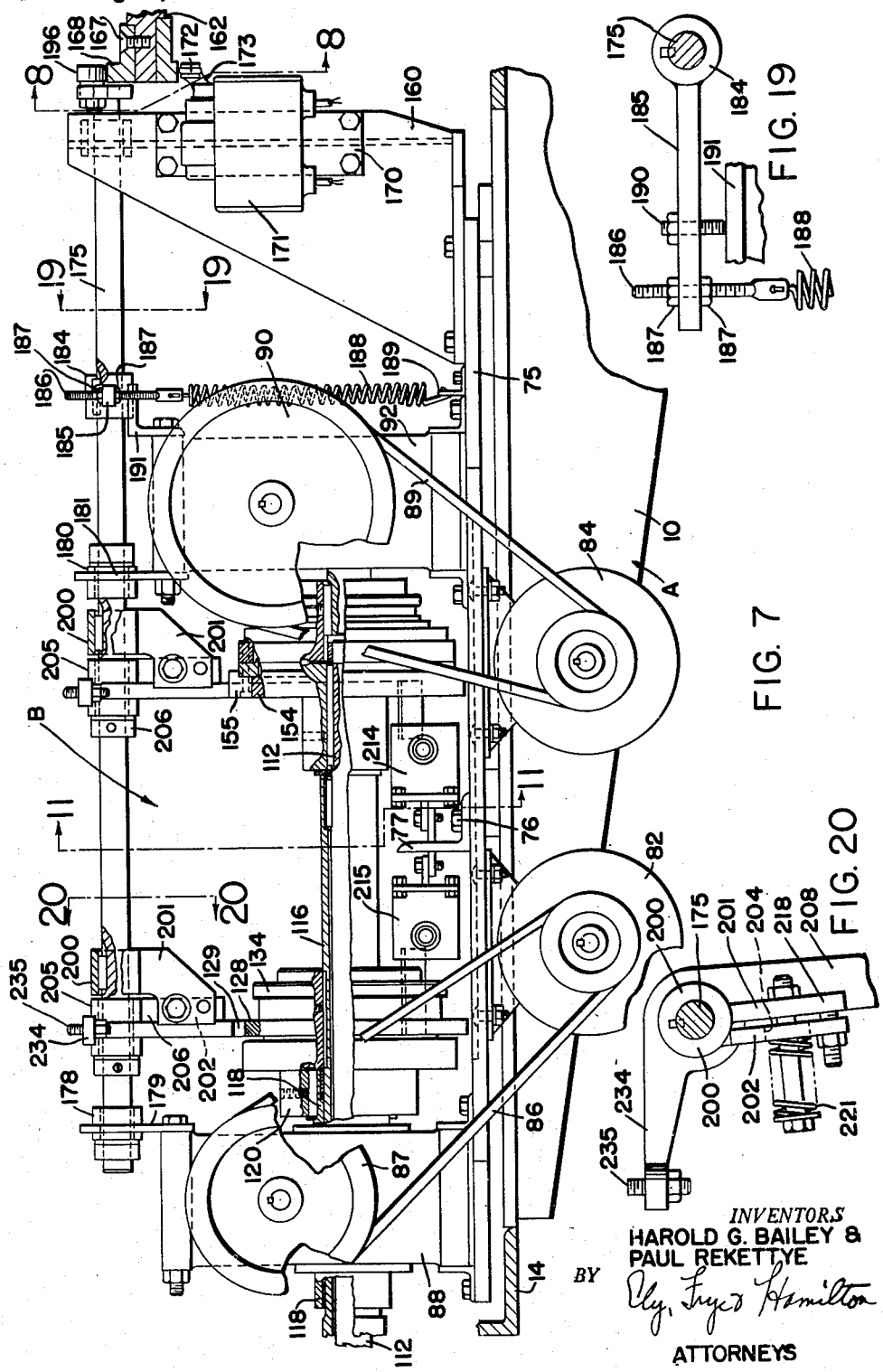
INVENTORS
HAROLD G. BAILEY &
PAUL REKETTYE
BY
ATTORNEYS May 20, 1958  H. G. BAILEY ET AL  2,834,986
MACHINE FOR ROTATIONAL CASTING
Filed Aug. 4, 1954  8 Sheets-Sheet 6
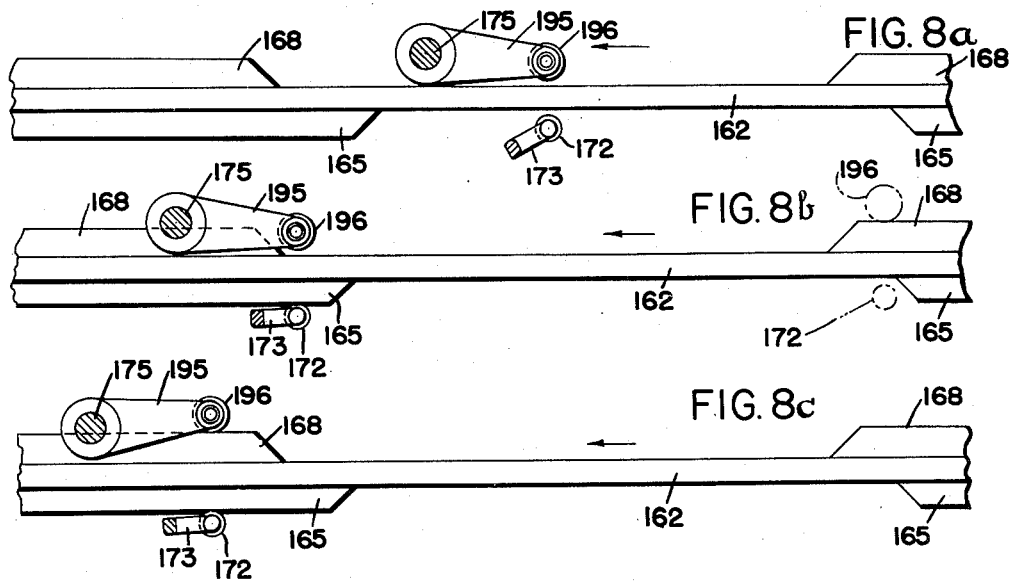
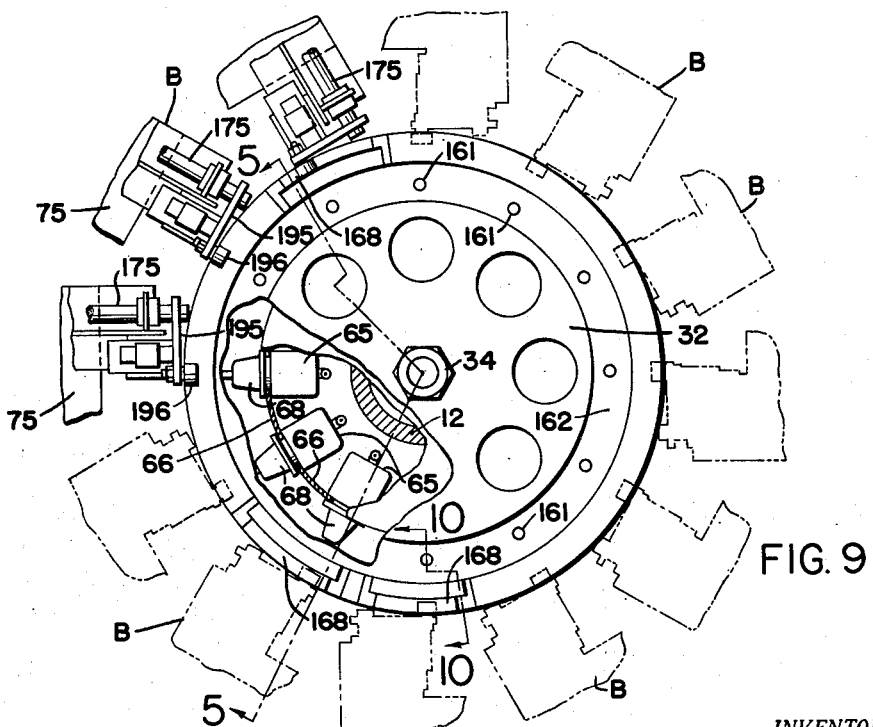
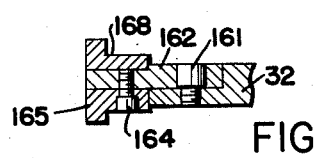
INVENTORS
HAROLD G. BAILEY &
PAUL REKETTYE
BY
ATTORNEYS

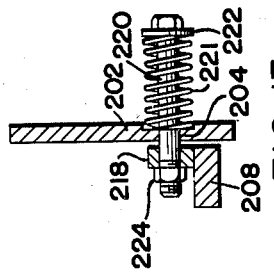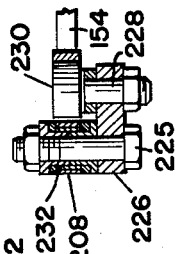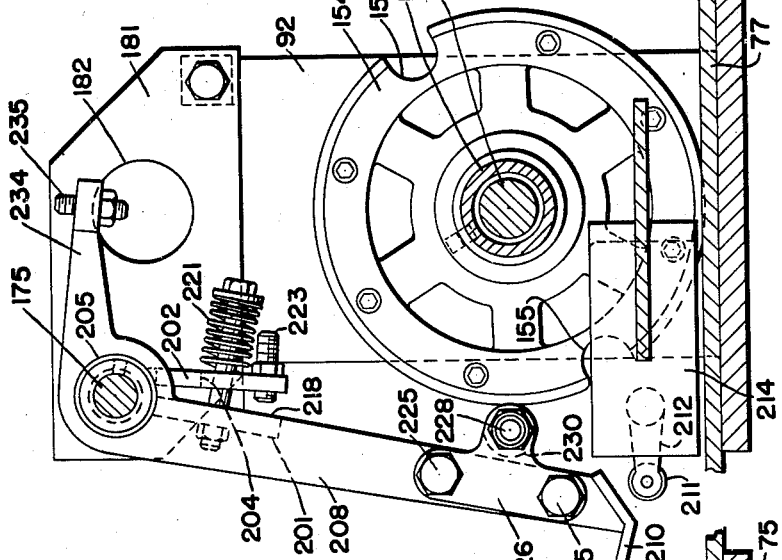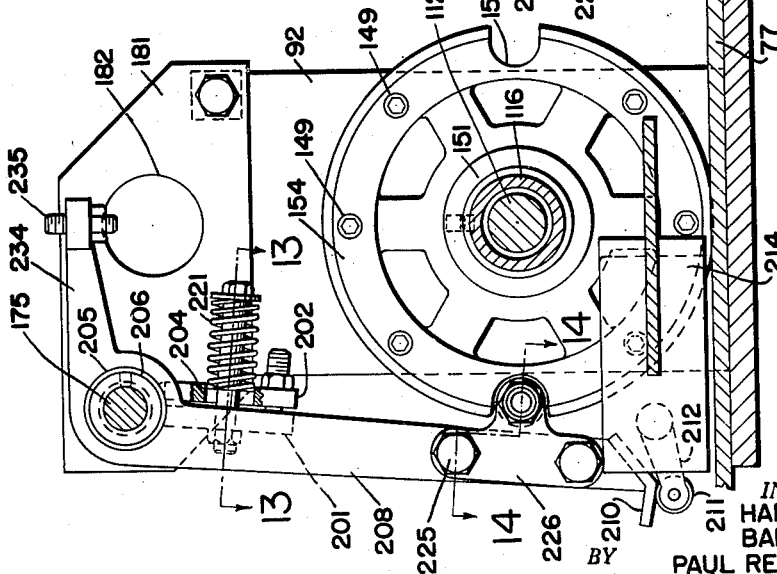

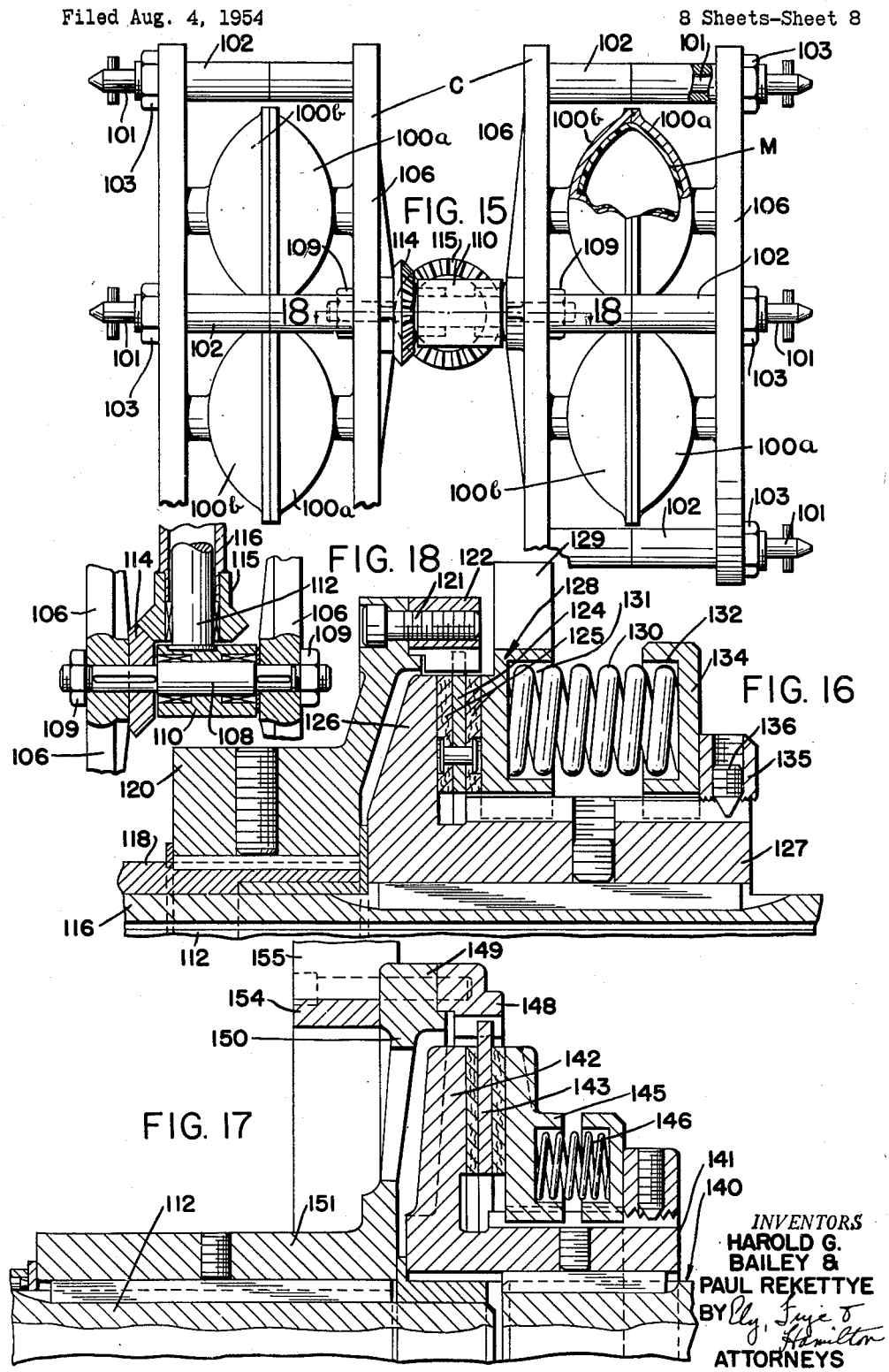

United States Patent Office 2,834,986
Patented May 20, 1958

2,834,986
MACHINE FOR ROTATIONAL CASTING

Harold G. Bailey, Silver Lake, and Paul Rekettye, Akron, Ohio, assignors to The Sun Rubber Company, Barberton, Ohio, a corporation of Ohio Application August 4, 1954, Serial No. 447,789

10 Claims. (Cl. 18—26)

This invention relates to machines designed to facilitate the casting of hollow objects by the process of rotating on divergent axes a non-porous mold having a charge of a heat fusible material therein. While it is not to be considered as confined thereto, it is primarily intended for the casting of hollow articles from polyvinyl resins or similar plastisols. The basic process of casting articles from materials of this nature is described in the Molitor Patent No. 2,629,134, dated February 24, 1953.

The machine shown and described herein is intended for the production of articles in large commercial quantities. It is designed also so that it can be used in conjunction with automatic devices for charging the molds and for opening and closing the molds.

The machine is shown as comprising a conveyor in the form of a turntable which is progressively advanced through several stations where the successive operations are performed on the molds. In the preferred form of the invention, the turntable is rotated intermittently. At one point or station in the cycle, the molds are opened and the finished articles removed. In the preferred form of the invention shown herein, the molds are passed through a preheating zone or oven in which the molds are raised to a temperature which will cause the plastisol to gel when it strikes the hot molds, the purpose of which is to reduce excessive rinds, which will be caused by seepage of the plastisol through the parting line of the mold. This is because the plastisol will form a skin or film which will prevent seepage through crevices in the mold.

At another station the molds will be charged with the required amounts of plastisol and the machine is constructed so that the rotation of the molds will be arrested in upright position in order that the charging may be done by any suitable machinery.

After charging, the molds are closed and locked and immediately set in rotation upon the two divergent axes to distribute the plastisol evenly over the inner surface of the mold. The rotation of the mold must be done in such fashion that the plastisol does not tend to track over any fixed path but on the contrary distributes itself uniformly over the whole inside surface of the mold.

The machine shown and described herein is particularly designed to secure a wide variation between speeds of rotation on the major axis and speeds of rotation on the minor axis. This capability of varying the rotational speeds upon the two axes is very important in the making of objects which have irregular or non-symmetrical forms. It is advisable to conform the speeds of rotation to the peculiar requirements for the article being produced, otherwise the deposition of the plastisol will tend to be irregular.

One of the outstanding features of the machine shown and described herein is that it is equipped with removable mold rotating and holding units so that in adapting the machine to any particular casting requirements, units may be easily replaced.

While the machine shown herein is of the turntable type, the principles of the invention may be adapted to any form of conveyor. It is also apparent that many features of the invention are relatively independent of others and all features need not be used in a single machine to accomplish many of the purposes of the invention. It is also obvious that changes and modifications may be made without sacrificing the benefits of the invention.

The machine is shown in its best known and preferred form. The machine is intended to be operated by a timer of any standard construction (not shown) which will control the operation of the conveyor motor.

Fig. 2 is a horizontal section taken near the base of the machine, the location of this view being on the line 2—2 of Fig. 5.

Fig. 3 is a detail on the line 3—3 of Fig. 2 showing a switch for stopping the rotation of the conveyor or turntable.

Fig. 5 is a vertical section through the machine showing one of the mold rotating arms in elevation. It also shows a detail of an oven through which the mold units pass in succession. The location of this section is indicated by the line 5—5 in Fig. 9.

Figure 6:
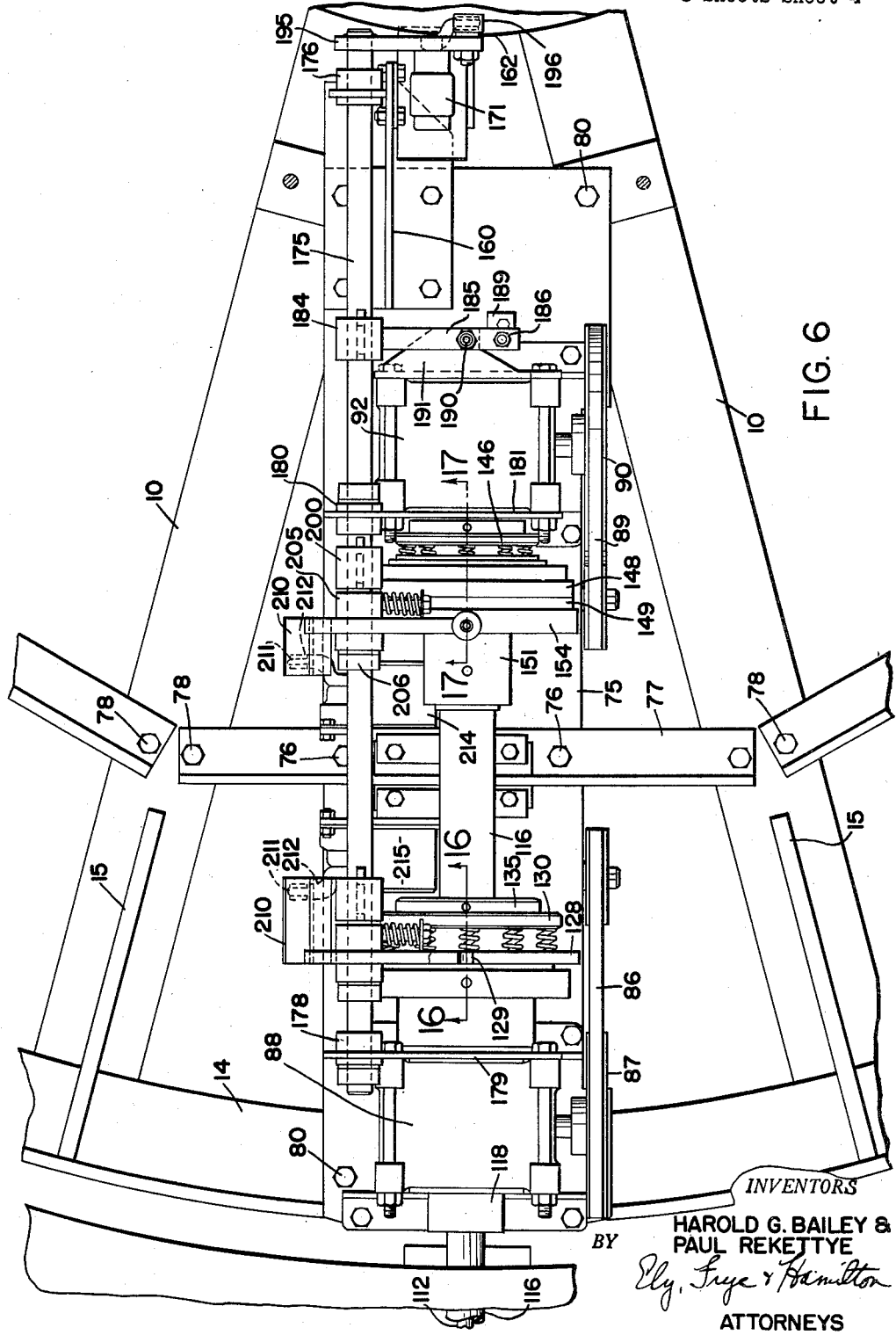

Fig. 6 is a plan view of a mold rotating unit.

Fig. 7 is a side view of one of the mold rotating units on a larger scale.

Figs. 8a, 8b and 8c are views showing the positions of the control cams and arms which first slow down and then arrest the rotation of the mold upon its two axes, the object being to present the mold units in a fixed position whenever the rotation of the mold is arrested. This is important if automatic mold opening and closing devices and automatic charging devices are used. The views are on the line 8—8 of Fig. 7.

Fig. 9 is a plan view looking at the top of the machine showing the relation of the several units to the control cams. This view is on the line 9—9 of Fig. 5.

Fig. 10 is a detail on the line 10—10 of Fig. 9.

Fig. 11 is a vertical section on the line 11—11 of Fig. 7, showing one of the clutches which arrest the movement of the mold holders at a fixed position on either axis of rotation. While the clutch shown is that for stopping the rotation of the mold on its major axis, the same type clutch is employed to arrest the rotation of the mold upon its minor axis. In Fig. 11 the clutch is shown engaged.

Fig. 12 is a view similar to Fig. 11 but showing the clutch disengaged and in running position.

Figs. 13 and 14 are sections on the lines 13—13 and 14—14 of Fig. 11.

Fig. 15 is a detail view of a mold unit on the line 15—15 of Fig. 5.

Fig. 16 is a section on the line 16—16 of Fig. 6, showing the friction brake for the minor axis of rotation and Fig. 17 is a corresponding section on the line 17—17 of Fig. 6 showing the brake for the major axis of rotation.

Fig. 18 is a section on the line 18—18 of Fig. 15.

Figs. 19 and 20 are detailed sections on the line 19—19 and 20—20 respectively of Fig. 7.

General description

Figure 1:
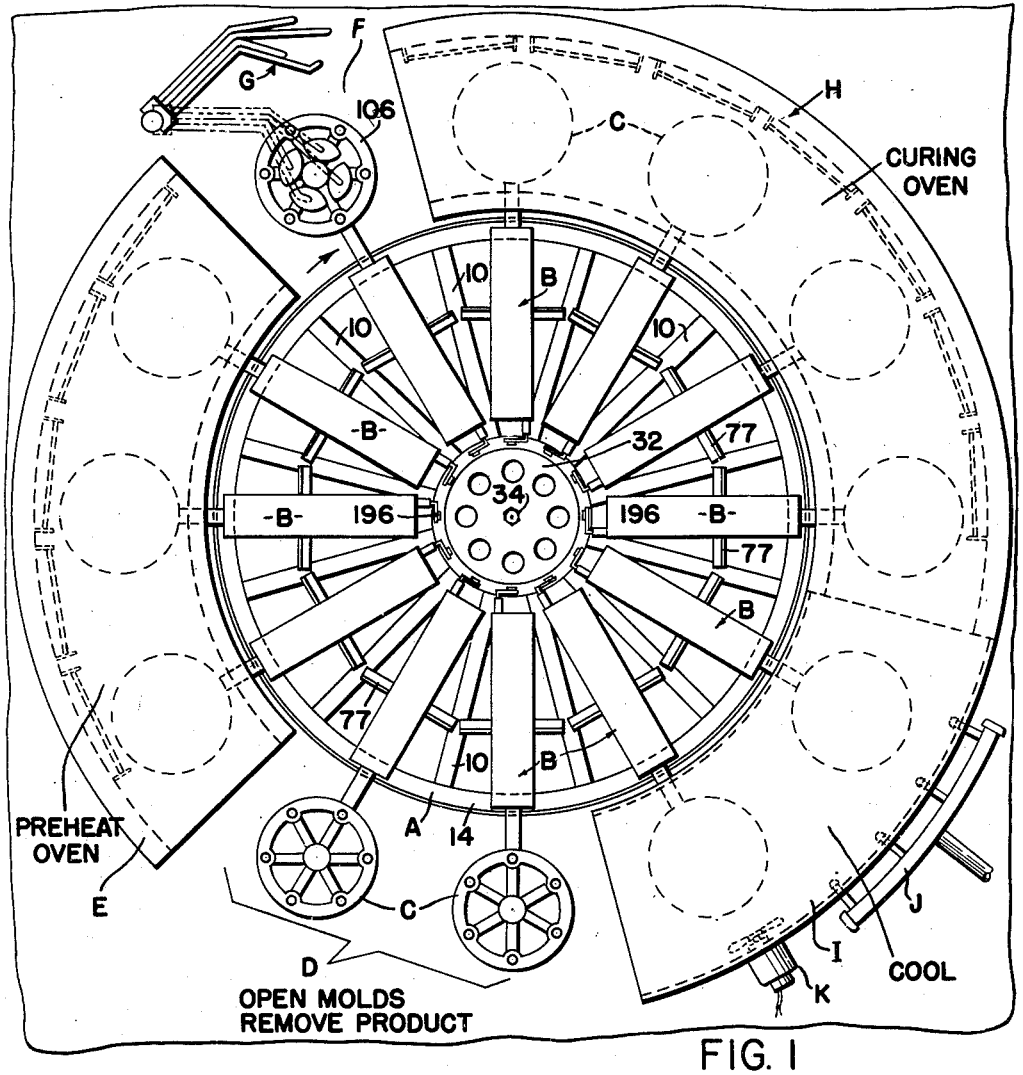
Fig. 1 is a more or less schematic view of the machine of the present invention looking from above.
Figure 4:
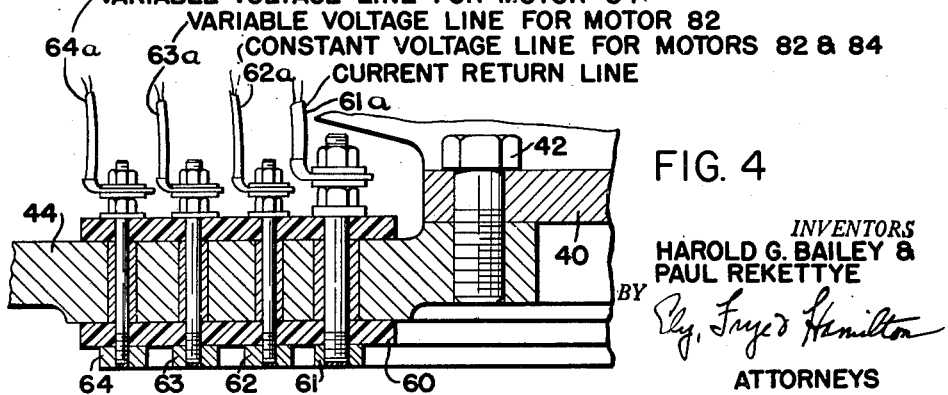
Fig. 4 is a detail on the line 4—4 of Fig. 2 showing the conductor rails by which power is supplied to the machine.

In the form of the invention which is shown, there is provided a conveyor in the form of a turntable A on which are mounted a plurality of mold supporting and rotating units B. These units are radially positioned about the turntable with the molds C projecting beyond the turntable. Twelve units are shown in Fig. 1, but this number is optional and may be increased or reduced.

In the embodiment shown, the mold holding and rotating units are removably mounted on the turntable so that individual units may be interchanged.

At one station, here shown as the station D and comprising two positions of the arm, the molds will be opened and the products removed. At this point automatic mold opening and closing devices may be installed.

The turntable is shown as rotating in clockwise direction and adjacent the station D is a heating tunnel E, through which the molds are carried and where they are brought up to the temperature at which the plastisol will gel after it strikes the hot mold. In Fig. 1 three units are shown in the preheating tunnel but there is no limitation as to the extent of the preheating tunnel and it may even be omitted.

Immediately after passing out of the preheating tunnel, the molds reach the charging station F where the molds are opened to receive the charge of plastisol, and then closed and locked. A charging device is indicated at G.

Immediately the molds receive their charges of plastisol and are closed and locked, they are started in rotation to distribute the plastisol and this rotation is maintained during the travel of the molds to station D. As the mold units leave station F, they pass into the long heating tunnel H, where the molds are heated to complete the gelling and fusing of the pastisol.

The molds then pass to a cooling chamber I where they encounter sprays of water from the spraying unit J, which brings the molds down to a temperature at which the articles can be removed from the mold units at station D. Fans K many be employed to blow water from the molds preparatory to passing out of the cooling chamber I.

*The turntable and its operating mechanism*

The turntable A is an open wheel-like structure composed of radial beams 10 which are welded to a central vertical tubular shaft or sleeve 12, and to an outer circular ring 14 which is angular in cross section and connected to the radial bars by vertical webs 15. The lower side of the ring 14 is located over rollers 16 at convenient intervals in brackets 17 on the inner walls of the ovens forming the tunnel sections surrounding the turntable, which serve to steady the turntables.

The tubular shaft 12 surrounds and is supported on a a vertical stationary central post 18, the lower end of which is held in a central sleeve 20 rising from a bed plate 21 and supported by the plurality of diagonal braces 22. A tapered roller-bearing 24 is located between the lower end of the sleeve 12 and the post and the upper end of the sleeve is provided with a second tapered roller-bearing 25 located at the reduced upper end of the post 18 (Fig. 5). The upper end of post 18 is reduced and threaded and lock nuts 28 hold the sleeve in position and provide bearing adjustment. A collar 29 is located beneath the bearing 25 and packings 30 and 30a are located at the upper and lower ends of the sleeve 12. On the extreme upper end of the post 18 is supported a plate 32 having a flange 33 which surrounds the upper end of sleeve 12. A nut 34 on the extremity of the central post keeps the plate in position. The plate 32 serves as a support for the cam elements which control the rotation of the several casting units, as will be described.

Welded to the lower inner ends of the beams 10 and to the exterior of the sleeve 12 is a flat ring 40 to the outer rabbeted circumference of which is fastened, by bolts 42, the gear 44 which drives the turntable. The outer edge of the gear is formed with teeth which mesh with pinion 45 on the upper end of a drive shaft from a gear reduction unit which is given the reference numeral 46 and which is mounted on standards 47 rising from the bed plate 21. The gear reduction unit is of any standard type and is driven by belts 48 from a motor 50 also mounted on the bed plate.

The motor 50 is started at the beginning of an operation by the operator but thereafter an automatic variable timer takes over to restart the motor after each pause in the rotation of the turntable. The duration of the dwell may be changed to suit different classes of work, but it should be sufficient to enable the operator at station D to open the molds, take out the article and close the molds, and the operator at station F to open the molds, insert the charges of plastisol therein and close the molds.

The motor 50 is an A. C. motor of the type which has a fast speed winding and a slow speed winding. Means are provided to change from the high speed winding to the low speed winding as the turntable approaches the stopping point. At the same time that the slow speed winding is connected, a direct current is turned on to the high speed winding which brings the motor to a stop at the designated points in the cycle.

To accomplish the automatic stopping of the turntable, the gear 44 is provided near its outer periphery with a series of upstanding pins 52, equal in number and spaced to conform to the location of the several mold supporting and rotating units B. Located between two of the radial braces 22 and carried on the top of two posts 54 and welded thereto, is an arc-shaped rail 55. To the upper side of rail 55 are attached two switches 56 and 57, each of which has a spring loaded switch operating arm 56a or 57a, which overhangs the gear 44 in the path of the pins 52.

In the embodiment of the invention shown in the drawings, the switch 56 changes the motor 50 from fast winding to slow winding and at the same time turns a direct current into the high speed winding, the switch 57 turns off the A. C. current and the slow winding which brings the motor to an abrupt stop. The location of the switches 56 and 57 is such that one pin 52 will strike the arm 56a just before the next adjacent pin 52 strikes the arm 57a. The heavy table is moving very slowly (normally it takes about 5 seconds to move one-twelfth of the complete arc) and this arrangement brings the table to a stop at the exact place so that any mold operating devices will be in correct position. This is shown in Fig. 2, where the one pin 52 has just left its arm 56a while the next pin 52 is in contact with the arm 57a. After the turntable has rested for the required interval, the automatic timer (not shown) starts the motor 50 on high speed.

As will be described in connection with the mold supporting and rotating units each has two motors therein for rotating the mold unit on its major and minor axes respectively. These are variable speed D. C. motors having a single slow speed voltage line for the slowing down of the motors and separate variable high speed voltage lines for the operating periods. This latter arrangement is for the purpose of varying the ratios of rotational speeds on the major and minor axes, respectively, so as to get an infinite number of permutations between speed rotations upon the two axes. Such flexibility is desirable for the casting of all sorts and types of articles which require special rotative cycles to secure the desired deposition of plastisol over irregular or non-symmetrical molding surfaces.

To supply current to the D. C. motors, the underside of the gear 44 carries a plate 60 on which are mounted collector rings 61, 62, 63 and 64, which are contacted by brushes shown in Fig. 5. For example, the ring 61 is the current return line, the ring 62 is the constant slow speed voltage line, the ring 63, the variable voltage line for the motor which rotates the mold unit on its minor axis and the ring 64 for the motor which rotates the mold unit on its major axis.

From the various rings, lines 61a, 62a, 63a, and 64a conduct the currents to a plurality of junction boxes 65 located in a housing 66 surrounding the sleeve 12 at the top of the turntable. These several boxes 65 are to receive plugs 68 for each mold supporting and rotating unit. In this way each mold unit may be plugged into the electric circuits which operate the mold rotating motors.

Mold supporting and rotating units

The twelve mold rotating and supporting units B are the same in construction.

A unit is mounted upon a plate 75 which is attached by bolts 76 at about its center line to a transverse angle iron 77. The angle iron 77 extends across two beams or spokes 10 of the turntable to which it is fastened by bolts 78. Additional bolts 80 at the inner and outer end of the plate secure it to the beams 10 and the outer ring 14.

Suspended from the underside of plate 75 are two motors 82 and 84, the motor 82 being the one which drives the mold unit on its minor axis and the motor 84 being the motor which drives the mold unit on its major axis. The pulley for each motor is located beyond the edge of the plate 75. Motor 82 is connected by belt 86 to a pulley 87 on a speed reducing unit 88 located at the outer end of the plate 75. The motor 84 is connected by belt 89 to the pulley 90 of a speed reducing unit 92 located near the inner end of the plate 75. It will be noted that the pulley 90 is larger than the pulley 87 and that the gear reducer 88 has a lower gear ratio than gear reducer 92. This is because it is necessary to rotate the shaft which drives the mold on its minor axis at a different speed than the shaft which rotates the mold on its major axis, the rotation on the minor axis being the difference between the speeds of the two shafts. No specific ratio is observed because different articles require different treatment. In addition to the pulley differential and the gear reduction variations, the variable voltage lines 63a and 64a, which are under control of the operator, provide added means to vary the relative speeds of rotation on the major and minor axes while the machine is in operation.

A typical mold unit C is shown in Fig. 15, a toy football M having been selected as a simple form of non-spherical object which requires a special type of rotation to secure proper distribution of the plastisol. Each mold is made in two sections 100a and 100b, located on plates 106 and held together by transverse bolts 101 which pass through sleeves 102 on each plate. The plates 106 are either perforated or spoked to allow air and water to circulate over and around the molds. Nuts 103 clamp the mold sections together.

As shown in Fig. 1, each pair of plates hold four molds and as there are two sets of plates in each unit, eight articles may be cast in a single unit. The number is optional and the relative position of the molds with respect to their supporting arms may be varied. While upper and lower banks of molds are shown on each arm, this is not necessary as a single bank may be employed. Where two banks are employed the mold rotation may be stopped with either bank uppermost.

The inner plate 106 of each pair is removably fitted over and keyed to a transverse shaft 108 to which it is held by a nut 109. The shaft 108 rotates in roller bearings in a sleeve 110 to provide the minor axis of mold rotation. The sleeve 110 is secured to the outer end of a long shaft 112 which extends lengthwise of the unit B and provides the major axis of rotation. A bevel pinion 114 is keyed to the shaft 108 and meshes with a second bevel pinion 115, which is fixed to the outer end of a long sleeve 116 which surrounds the shaft 112.

The sleeve 116 passes through the speed reduction unit 88 where it is driven through reduction gearing (not shown) which engages a hollow driving shaft 118 journaled in the unit and extending to either side thereof. On the inner end of the shaft 118 is keyed one member 120 of a friction driving clutch of any standard construction such as shown in detail in Fig. 16.

The element 120 has secured by bolts 121 to its outer perimeter a ring 122, the inner circumference of which is notched and engages a notched disk 124 which has secured to opposite sides thereof friction linings 125. The disk 124 lies between a flange 126 formed on one end of a long sleeve 127 which surrounds and is keyed to the shaft 116 and a second disk shaped ring 128. Ring 128 is slidably keyed on to the sleeve 127 and is held in contact with the adjacent face of the disk 124 by a plurality of coil springs 130 which are seated in recesses 131 in the ring 128 and opposed recesses 132 in a backing ring 134 which is also keyed to the sleeve 127. A backing ring 135 is threaded to the inner end of sleeve 127 and is held by set screw 136 at the position where it will maintain the requisite pressure on the friction disk 124. The purpose of the friction clutch is to allow the motor 82 to coast when the mold unit comes to the point where it is locked in position of rest by the mechanism which will be described. The ring 128 is the clutch disk for the locking mechanism which seizes it to hold the mold unit in the desired position when its rotation is arrested. For this reason the ring 128 has two notches 129, 180° apart because the molds are usually in multiples of two.

The shaft 112, which affords the major axis of rotation, extends inwardly beyond the inner end of the tubular shaft 116. Like the shaft 116 it receives its rotation through a friction clutch similar to the one just described, but oppositely positioned as seen by comparing Figs. 16 and 17.

Referring to Fig. 17 the output shaft 140 from the speed reduction unit 92 is in alignment with the shaft 112 and has keyed and fixed thereto the sleeve 141 of a friction drive clutch, the outer end of which is provided with the flange 142. A friction disk 143 is located between the flange 142 and the backing ring 145 which is held by springs 146 in the same manner as described in connection with the elements shown in Fig. 16.

The friction ring 145 is notched and engages notches in a surrounding ring 148, which is fixed by bolts 149 to the outer periphery of a flange 150 formed as a part of sleeve 151 which surrounds and is keyed to the inner end of shaft 112. In this manner the motor 84 is permitted to coast after the rotation of the shaft 112 has been stopped by the stop clutch to be described. Held on the sleeve 151 by the bolts 149 is the clutch stop ring 154 which has the diametrically opposed notches 155 similar in location and function to the notches 129 on the ring 128.

It will be seen that a complete operative unit has been provided as a mold supporting and rotating unit which is adapted to be removably and replaceably mounted on the turntable A for transportation through the several stations at which the various steps in the process are performed. It is apparent, however, that each unit B is capable of use on other types of supports or conveyors and is not necessarily for the type of conveyor or turntable shown herein.

Mold rotation arresting mechanism

As has been noted heretofore it is desirable to bring the rotation of the mold units to a halt both on their major and minor axes at fixed points. The purpose of this is to provide for the servicing of the units by automatic or semi-automatic mechanisms which require the definite and fixed location of the molds while at rest. Stopping the rotation on the major axis at fixed points will insure that the molds lie in a horizontal plane while stopping the rotation of the molds on the minor axis at fixed points will insure that the molds are definitely spotted for the servicing units. Where two banks of molds are on each arm it does not make any difference which bank is up or down and hence the mechanism provides for arresting the major rotation at two points 180° apart. Hence, we show two notches 155 on the clutch disk 154. If only one bank of molds is used, a removable filler piece (not shown) may be inserted in one of the notches.

Likewise on the clutch disk 128 there are two notches 129 which is because the mold cavities will usually be in multiples of two, but the number of notches may be changed to conform to any number of mold cavities.

The two clutch rings are identical in their operative parts and the clutch ring has been selected which is shown on the right of Figs. 5, 6 and 7 and which is the one for arresting the mold on its major axis of rotation.

The turntable rotates intermittently advancing a distance equal to the spacing of the mold units thereon. While the mold units are in the chambers E, H, and I, the rotation thereof should continue but at the stations D and F the mold rotation should be stopped with the molds in their proper positions as has been described. At the station D where two sets of molds are operated upon, the cams for operating the mold arresting mechanism will be in duplicate. The mechanism consists of means first to slow down the two motors 82 and 84 and then to lock the two shafts and at the same time shut off the current to both motors.

At the inner end of each plate 75 is fastened an upright bracket 160, the inner edge of which passes close to the edge of the plate 32. Fastened by bolts 161 to a ledge on the plate 32 is a cam supporting ring 162 (Fig. 10). To the lower side of ring 162 are fastened by bolts 164 at the stations D and F, cams 165 which operate slow speed switches, while fastened to the upper side of the ring by bolts 167 are second cams 168 which throw in the positive clutches to stop the mold rotation at the exact points selected and shut off the current to both motors.

Attached by plate 170 to the bracket 160 is the box 171 containing the slow speed switches for the motors 82 and 84. A spring loaded switch arm 173 having a roller 172 on its outer end normally rides in the position shown in Fig. 8a and during the periods while the turntable is moving and while the mold units are not at either C or F stations, the normal current will be conducted to the motors. When however, the turntable, which is moving in the direction of the arrows in Figs. 8a, b, and c, brings the mold toward its station of rest, the roller 172 rides up over the cam which closes the slow speed switch and opens the main line so that the motors will be retarded just before the rotation of the mold unit is stopped. When the turntable resumes its rotation the roller 172 will pass off the other end of the cam and the main line circuit will be restored.

To lock each shaft 112 or 116, there is provided along the upper edge of the plate 75, as shown in Fig. 6, a clutch operating rock shaft 175 which is rotatably mounted at its inner end in a bearing 176 carried on the rear of the bracket 160. At its outer end the shaft is rotated in a bearing 178 supported in a plane 179 attached to the upper side of the speed reducer 88. At an intermediate point the shaft is supported in a bearing 180 carried by a plate 181 attached to the speed reducer 92. Plates 179 and 181 have holes such as 182 by which the unit may be handled.

Keyed to the rock shaft is a collar 184 to which is welded a radial arm 185 in the outer end of which is an eye bolt 186 fixed by nuts 187. A coil spring 188 attached to the lower end of the set screw and to a bracket 189 on the plate 75 exerts spring tension on the shaft 175 to rotate it downwardly. A second set screw 190 on arm 185 is arranged to strike against a bracket 191 attached to the speed reducer 92 to stop the rotation of the shaft 75.

To the extreme inner end of the shaft 175 is fixed an arm 195 in the outer end of which is journaled a roller 196 which is located in the path of the cams 168. Normally the shaft 175 will be in position with the set screw 190 bearing on bracket 191 and with the roller 196 out of contact with the ring 162 as shown in Fig. 8a. Shortly after the roller 172 has ridden up on the cam 165, slowing down the motors 82 and 84, the roller 196 will ride up over the cam 168 and the locking mechanism will be applied and the current to the motor shut off. It will also be noted, looking at the dotted lines at the right hand side of Fig. 8b, that the roller 172 leaves the cam 165 and the main line to the motors is reestablished before the roller 196 leaves the cam 168.

Keyed to the shaft 175, adjacent each stop clutch is a short sleeve 200 from which depends an angular bracket 201 which has an extension 202 parallel to and just below the shaft 175 and having a vertical slot 204. Journaled on the shaft 175 above the extension 202 is a sleeve 205 held in position by a collar 206 and a set screw on the shaft 175. Formed as a part of the sleeve 205 is an angular arm, the lower portion of which is given the numeral 208, and which is just to one side of the clutch disk 154 (or 128). The lower end of arm 208 carries a shoe 210 in the path of which is the roller 211 on the outer end of a spring loaded arm 212 for a switch 214. The switch 214 for the motor 84 and its companion switch 215 for the motor 82 are in the direct line to each motor. The switches are supported on the cross arm 77 as shown in Fig. 7. When the arms 208 are in the position shown in Fig. 12, the main lines are open to both motors, but when the arms are in the position shown in Fig. 11, the shoe 210 has depressed the lever 212 and the current to the motors is shut off. This will occur when the roller 196 is riding on a cam surface 168 and when the clutch arm engages one of the notches 155 (or 129).

Welded to the rear side of the arm 208, as viewed in Figs. 11 and 12, is a plate 218 and through this plate and through the slot 204 in the extension 202 is located a bolt 220, surrounding which is a coil spring 221, one end of which bears on the extension 202 and the other of which bears against the nut and washer 222. The inner end of the bolt 220 is held by the lock nut 224 against the plate 218. A set screw 223 in the extension 202 of the bracket 201 limits the approach of the two arms 201 and 208.

On the lower end of the arm 208 is fixed by bolts 225 a bracket 226, one arm of which extends toward the adjacent stop disk 154 (or 128). On a pin 228 set in the bracket 226 is a roller 230 which rides on the rim of the disk or will engage one of the notches therein if the arm 208 is free to move to the right as in Figs. 11 and 12.

To absorb the shock when the roller 230 engages the notch in the disk, a rubber bushing 232 is located between the bolt 225 and the arm 208.

The upper end of the arm 208 has an extension 234 in which may be located a set screw 235 which may be used as a safety device to disconnect any mechanism for opening the molds unless the mold units are locked in a position of rest.

The operation of these parts is as follows:

During normal running operations the shaft 175 and the arms 208 of each unit are held by the spring 188 and stop 191 in the position shown in Fig. 12 in which each shoe 210 is spaced from the switch arm 212 and each roller 230 is riding either just in contact with or slightly spaced from the rim of its stop disk. At this time the roller 196 is riding free of the cam 168. As the turntable moves the particular unit toward its position at the operative stations C or F, the roller 196 rides up on cam 168 which swings the bracket 201 to the right, placing the spring 221 under compression.

This will also cause the roller 230 to bear against the rim of the disk but the arm 208 cannot move inwardly until a notch 155 (or 129) passes beneath the roller 230. When this occurs the arm 208 will snap into the position shown in Fig. 11, locking the shaft 112 (or 116).

The inward movement of the arm 208 opens the switch to the motor 82 or 84.

When the turntable resumes its rotation the roller 196 will restore the parts to running position.

*Resumé*

The operation of the mechanism will be understood from the foregoing. So far as known, this is the first machine for rotational casting in which there has been provided a conveyor of the turntable or any other type provided with complete operational units having mechanisms to rotate the mold holders independently of any progressive movement of the conveyor. It is the first device of its kind in which the complete rotational units may be replaced. It is the first rotational casting machine which has incorporated therein a provision for adjusting the relative speeds between the major and minor axes of rotation, independently of each other and independently of the movement of the conveyor.

The machine also stops the rotation of the mold operating unit on both axes and at fixed positions when certain predetermined locations are reached.

To conserve the heat in the preheating and in the gelling and fusing ovens, these ovens may be equipped with automatic doors, not shown, which will open up as the rotating units are about to enter or leave the oven. This may be manually or automatically controlled. To conserve heat during the passage of the units through the ovens, the wall of an oven is provided with a slot or channel 240 shown for example in Fig. 5, through which the mold supporting shafts will pass. Attached to the upper side of the ring 14 is a circular shield 241 which maintains a running contact with flexible sheets 242 attached to plates 243 on the top and bottom of the slot 240. These sheets may be made of any flexible material which is sufficiently resistant to the heat of the ovens and to bending to maintain a close contact with the shield 241. The material known as "Teflon," a product of E. I. du Pont de Nemours Co., and said to be a plastic consisting of a tetrafluorethylene polymer, has been used successfully for the purpose.

This arrangement makes it possible to subject the molds and the immediate parts of the carrier to the heat of the ovens and the cooling sprays while the conveyor and the mold turning mechanisms are outside of the ovens.

If the step of preheating the molds is omitted the stations D and F will be adjacent to one another.

What is claimed is:

1. Apparatus for rotational casting in molds comprising a conveyor, means to move the conveyor from one to another of a series of stations, a plurality of self-contained mold supporting and rotating units removably mounted on the conveyor, a mold carrier mounted on each unit for simultaneous rotation on two divergent axes, independent power means on each unit to rotate said carriers on each of said axes, control means on each unit for each of said power means, and means on the conveyor to operate said control means of a selected unit for stopping the rotation of the mold carrier on said selected unit at a predetermined point in its cycle of rotation.

2. Apparatus for rotational casting in molds comprising a conveyor, means to move the conveyor from one to another of a series of stations, a plurality of self-contained mold supporting and rotating units removably mounted on the conveyor, a mold carrier mounted on each unit for simultaneous rotation on two divergent axes, independent power means on each unit to rotate said carriers on each of said axes, control means on each unit for each of said power means, means on the conveyor to operate said control means of a selected unit for stopping the rotation of the mold carrier on said selected unit at a predetermined point in its cycle of rotation, and means operated by the conveyor to slow down the rotation of said carrier before said control means is operated to stop its rotation.

3. Apparatus for rotationally casting in molds comprising a rotatable turntable having a plurality of radial beams, a plurality of mold supporting and rotating units removably mounted on said beams, a mold carrier mounted on each unit for simultaneous rotation on two divergent axes, independent power means on each unit to rotate said mold carriers on each of said axes, clutch means on each unit controlling each of said power means, and means controlled by said turntable for operating said clutch means.

4. Apparatus for rotationally casting in molds comprising a rotatable turntable having a plurality of radial beams, a plurality of mold supporting and rotating units removably mounted on said beams, a mold carrier mounted on each unit for simultaneous rotation on two divergent axes, independent power means on each unit to rotate said mold carriers on each of said axes, clutch means on each unit controlling each of said power means, locking means associated with said clutch means for locking the mold carriers in a desired position, and means controlled by said turntable for operating said locking means.

5. Apparatus for rotationally casting in molds comprising a rotatable turntable having a plurality of radial beams, a plurality of mold supporting and rotating units removably mounted on said beams, a mold carrier mounted on each unit for simultaneous rotation on two divergent axes, independent power means on each unit to rotate said mold carriers on each of said axes, clutch means on each unit controlling each of said power means, locking means associated with said clutch means for locking the mold carriers in a desired position, means to retard rotation of said mold carriers by said power means, and means controlled by said turntable to first operate the retarding means and then to operate said locking means.

6. Apparatus for rotationally casting in molds comprising a rotatable turntable having a plurality of radial beams, a plurality of mold supporting and rotating units removably mounted on said beams, a mold carrier mounted on each unit for simultaneous rotation on two divergent axes, independent power means on each unit to rotate said mold carriers on each of said axes, clutch means on each unit controlling each of said power means, locking means associated with said clutch means for locking the carriers in a desired position, means controlled by said turntable for operating said locking means, and means actuated by said locking means to shut off said power means.

7. Apparatus for rotationally casting in molds comprising a rotatable turntable having a plurality of radial beams, a plurality of mold supporting and rotating units removably mounted on said beams, a mold carrier mounted on each unit for simultaneous rotation on two divergent axes, independent power means on each unit to rotate said mold carriers on each of said axes, clutch means on each unit controlling each of said power means, locking means associated with said clutch means for locking the mold carriers in a desired position, means to retard rotation of said mold carriers by said power means, means controlled by said turntable to operate said retarding means, and means controlled by said turntable to operate said locking means after rotation of said mold carriers has been retarded.

8. Apparatus for rotationally casting in molds comprising a rotatable turntable having a plurality of radial beams, a plurality of mold supporting and rotating units removably mounted on said beams, a mold carrier mounted on each unit for simultaneous rotation on two divergent axes, independent power means on each unit to rotate said mold carriers on each of said axes, clutch means on each unit controlling each of said power means, locking means operatively engaging said clutch means to stop said carriers in a predetermined position, a rocker shaft on each unit to operate said locking means, and means on said turntable to actuate said rocker shaft.

9. Apparatus for rotationally casting in molds comprising a rotatable turntable having a plurality of radial beams, a plurality of mold supporting and rotating units removably mounted on said beams, a mold carrier mounted on each unit for simultaneous rotation on two divergent axes, independent motors on each unit to rotate said mold carriers on each of said axes, clutch means on each unit controlling each of said motors, locking means operatively engaging said clutch means to stop the carriers in a predetermined position, means controlled by said turntable to retard said motors, and means controlled by said turntable to operate said locking means following retardation of said motors.

10. Apparatus for rotationally casting in molds comprising a rotatable turntable having a plurality of radial beams, a plurality of mold supporting and rotating units removably mounted on said beams, a mold carrier mounted on each unit for simultaneous rotation on two divergent axes, independent motors on each unit to rotate said mold carriers on each of said axes, clutch means on each unit controlling each of said motors, locking means operatively engaging said clutch means to stop the carriers in a predetermined position, means controlled by said turntable to retard said motors, means controlled by said turntable to operate said locking means following retardation of said motors, and means actuated by said locking means to shut off said motors.

References Cited in the file of this patent

UNITED STATES PATENTS

| | | |
|---|---|---|
| 1,341,670 | Powell | June 1, 1920 |
| 2,222,266 | Rubissow | Nov. 19, 1940 |
| 2,374,339 | Emerson | Apr. 24, 1945 |
| 2,583,955 | Lawson et al. | Jan. 29, 1952 |
| 2,629,130 | Rempel | Feb. 24, 1953 |
| 2,629,131 | Martin | Feb. 24, 1953 |
| 2,681,472 | Rempel | June 22, 1954 |